April 26, 1932.  A. ARUTUNOFF  1,855,274
OIL FILLED SUBMERGIBLE ELECTRIC MOTOR
Filed Jan. 14, 1929    2 Sheets-Sheet 1

Inventor
A. Arutunoff,
By George A. Prevost,
Attorney

April 26, 1932.   A. ARUTUNOFF   1,855,274
OIL FILLED SUBMERGIBLE ELECTRIC MOTOR
Filed Jan. 14, 1929   2 Sheets-Sheet 2

Inventor
A. Arutunoff,

By George A. Prevost,
Attorney

Patented Apr. 26, 1932

1,855,274

UNITED STATES PATENT OFFICE

ARMAIS ARUTUNOFF, OF BARTLESVILLE, OKLAHOMA

OIL FILLED SUBMERGIBLE ELECTRIC MOTOR

Application filed January 14, 1929. Serial No. 332,538.

This invention relates to motor protecting means, and more particularly to instrumentalities for protecting the electric motor of deep well pumps of the type designed to be submerged in the fluid to be pumped.

More specifically, the invention pertains to an oil filled submergible electric motor unit for deep well pumps, and consists especially in means for protecting said motor against leakage which ordinarily occurs by reason of expansion and contraction of the oil when the motor is started and stopped.

The primary object of the invention is to provide simple and efficient means whereby the oil in the motor unit will act as a seal to prevent leakage of foreign substances into the motor, due either to expansion and contraction of the oil, gravity movement along the motor shaft, or under the hydrostatic pressure of the fluid in which the motor is submerged. The mechanism is so designed as to prevent displacement of the sealing oil in course of time by the surrounding water or other fluid to be pumped.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawings.

Figure 1:
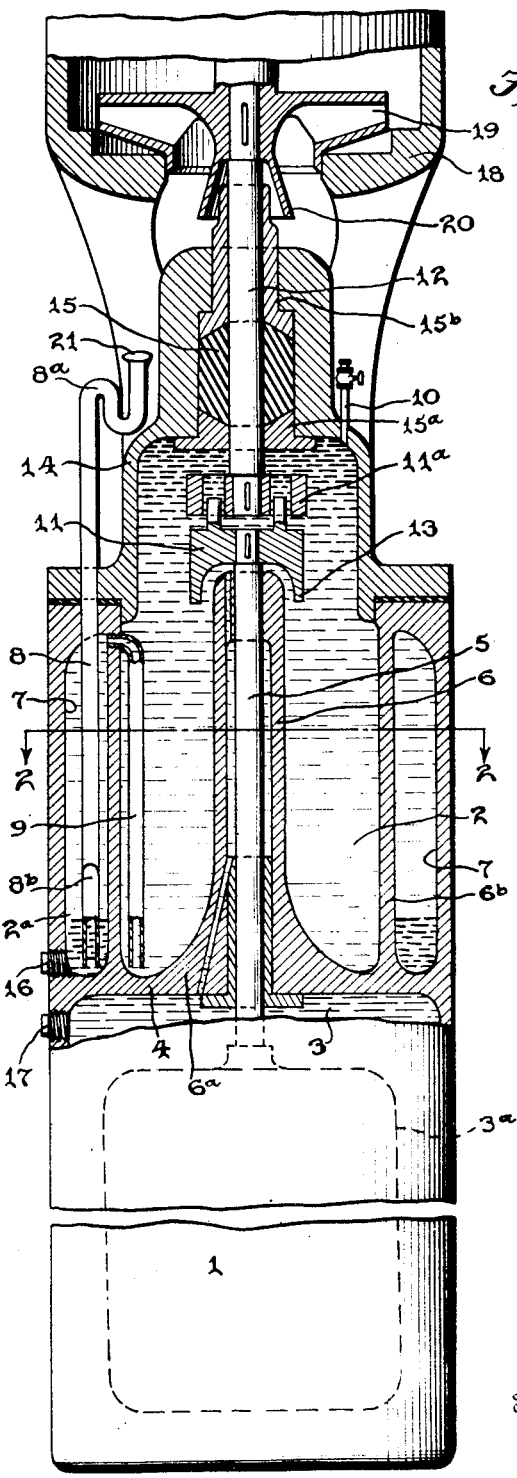
Fig. 1 is a vertical sectional view partly in elevation, of a vertical shaft motor unit provided with one form of my improvements.

In the embodiment of the invention illustrated in Fig. 1, 1 represents a vertically disposed cylindrical housing or shell, having upper and lower compartments 2 and 3, separated by an imperforate horizontal partition 4. The lower compartment contains a conventional vertical type electric motor 3a, the shaft 5 of which extends upwardly through a sleeve 6, preferably integral with the partition 4, and projecting upwardly from the central portion of the same. Of course, the sleeve may, if desired, be a separate part and be secured to the partition in any suitable manner.

A passageway 6a extends through the partition and sleeve, and places the chambers 2 and 3 in communication.

In this embodiment of the invention, a circular partition 6b, arranged in the compartment 2, provides an annular chamber 7 which communicates with the exterior of the unit by means of an open pipe 8 having upper and lower traps 8a and 8b.

A pipe 9 places the upper end of the annular chamber in communication with the lower end of the compartment 2, and from the foregoing it will be obvious that when sealing oil is poured into the pipe 8 from the exterior of the unit, it will first fill the annular chamber 7; then overflow into the compartment 2, through the pipe 9, and will finally rise to the point where it will overflow through the passageway 6a into the lower or motor chamber 3. In this way, the three compartments may be completely filled with the sealing oil.

A valved pipe 10 permits the escape of air while the chambers are being filled.

The motor shaft 5 is provided at its upper end with a coupling member 11 that is joined by a complementary coupling member 11a to the shaft 12 of the pump, which is arranged above the motor. The coupling member 11 has a depending skirt 13 which overlaps the upper end of the sleeve 6, and is spaced from the latter to permit the sealing oil to pass from compartment 2 to compartment 3, or vice versa, but this skirt functions as a protecting means to prevent any foreign substance descending on the shaft 12, from reaching the passageway 6a. Any such substance gravitating along the shaft will be deflected by the skirt, and will finally reach the lower end of the compartment 2.

The unit is preferably provided with a removable cover 14, carrying packing means for the shaft 12. Such means may include a compressible intermediate member 15, a compressing element 15a, and a bushing collar 15b, the latter projecting above the cover 14, for a purpose hereinafter described.

16 and 17 designate removable plugs which close openings that may be used either in filling or emptying the compartments 7 and 3 of the unit.

The casing of the pump which is operated by the motor, is shown at 18, and within this casing, the impellers 19 are arranged on the pump shaft 12. The lower one of the impellers has a substantially conical depending skirt 20, which overlaps the upper end of the collar 15b, and deflects foreign substances outwardly away from the collar, to assist in preventing such substances from working their way along the shaft 12, and into the protecting unit.

Before the apparatus is set in operation, air outlet 10 is opened, and the compartments 7, 2 and 3 are completely filled with some suitable sealing agent, such as oil, through the open end 21 of the conduit 8. After the filling, the valve of the air outlet 10 is closed. The filling can be expedited by feeding the oil directly through the openings closed by the plugs 16 and 17.

It is known that oil will always remain on top of water, and it is this principle that I have applied in the practice of my invention. This same principle governs to some extent the function of the skirts 20 and 13. Any exchange of fluids, due to different specific gravities, along the shaft 12, past the stuffing box, will be prevented by means of the skirt 20, and due to the fact that another small oil chamber is formed by said skirt 20, the leakage water or the like is prevented from rising at this point and coming in contact with the shaft 12. The skirt 13 functions in a similar manner.

When the motor is started, a certain amount of fluid will be expelled from the compartment 3, due to the compound action of the heat expanding the oil in the motor, and the centrifugal action of rotating parts. Consequently, oil will be expelled along the shaft 5, into the compartment 2, and through conduit 9, into the reservoir 7, and this will cause part of the oil from the reservoir 7 to be expelled through conduit 8, into the well. As long as the motor continues running, no water can leak into the compartment 2, or even into reservoir 7, as oil in the closed chamber cannot be displaced by water. Any exchange on account of difference in gravity between the oil in the motor and the fluid on the exterior of the unit, will be prevented by the skirt 20 and the traps 8a and 8b.

Should the motor be stopped, and permitted to cool off, some water from the well will be taken in through the opening 21 of the conduit 8, and this will settle in the bottom of the reservoir 7. The amount of water taken in will be equal to the amount of oil expelled when the motor was started, and the capacity of the reservoir 7 is such as to take care of oil volume variations, without danger of water ever filling it, or rising over the level L. Each time the motor is started, the expansion of the oil in the motor will expel through the conduit 8, the water previously drawn in.

As will be readily understood, from the drawings, water cannot endanger the motor, as any water taken in when the motor stops, is automatically expelled back into the well, as soon as the motor is started.

If, by any chance, the compartment 2 is not sufficiently filled with oil at the start, and water seeps in, even then protection is provided, because of the fact that when the motor is started, this water will be forced out by the expansion of the sealing oil.

Figure 2:
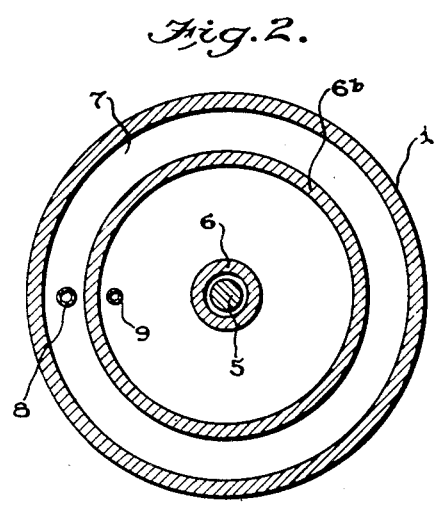
Fig. 2 is a horizontal sectional view on line 2—2 of Fig. 1.
Figure 3:
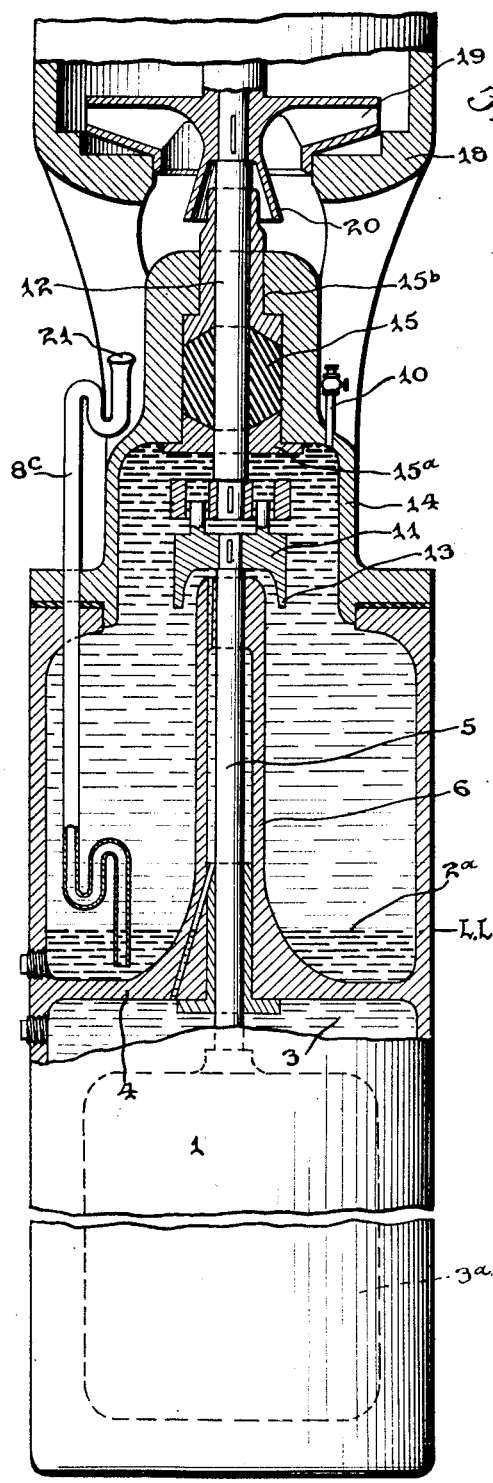
Fig. 3 is a view similar to Fig. 1, but showing a modification.
Figure 4:
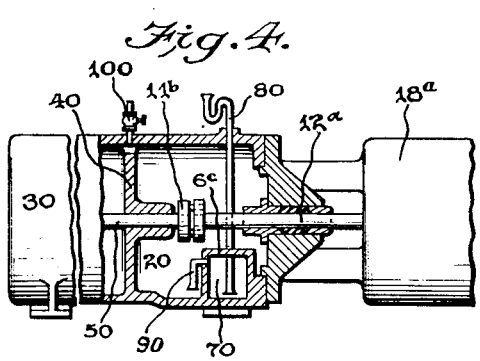
Fig. 4 is a view similar to Fig. 1, but showing one embodiment of the invention applied to a unit of the horizontal shaft type.

While Figs. 1 and 2 show what I now consider the preferred form of my invention, other practical embodiments are disclosed in Figs. 3 and 4.

The modification in Fig. 3 is similar to that in Fig. 1, but is of simpler construction, for the annular partition 6b and the pipe 9 are eliminated. In the modified structure, the chamber 2a is a single compartment, and the conduit 8a places this compartment in communication with the fluid surrounding the unit.

Fig. 4 shows my invention applied to horizontal motors. The same principle of a specially provided fluid exchange reservoir and open fluid passage, is employed. In this embodiment, the motor chamber 30 communicates along the motor shaft 50 with the chamber 20, in which the coupling 11b is located. A partition 6c in the chamber 20 provides an auxiliary chamber 70 which communicates with the fluid surrounding the motor unit, by means of a conduit 80 having a suitable trap therein. A pipe 90 places the upper end of the chamber 70 in communication with the bottom portion of the chamber 20. In this form of the invention, the valved air outlet 100 extends into the partition 40, and communicates with both chambers 20 and 30. Of course, in this form, the shaft 12a of the pump 18a is connected by the coupling 11b to the motor shaft, and both shafts are horizontally arranged.

In this embodiment, the water which is taken into the reservoir 70 when the motor is stopped, is expelled again by the expansion of the sealing oil, as soon as the motor is started and warmed up. Thus, full protection is provided, as not only all vital parts are surrounded with oil, but even the reservoir, where presence of water is admissible, is constantly free of water as long as the motor is in operation.

It will be noted that this apparatus, in any of its forms, is not affected by differing internal and external pressures, as these pressures always equalize themselves because of communicating passageways.

From the foregoing it is believed that the construction, operation and advantages of the invention may be readily understood, and I am aware that changes may be made in the details disclosed, without departing from the spirit of the invention, as expressed in the claims.

What I claim and desire to secure by Letters Patent is:

1. In combination, an oil filled submergible electric motor having a shaft and adapted to drive a pump, a shell housing said motor, a partition in said shell terminating in an upwardly directed sleeve surrounding the shaft and forming a compartment, a reservoir in said compartment, a fluid passageway connecting the upper part of said reservoir with the lower part of said compartment, a fluid passageway placing the lower part of said reservoir in communication with the fluid surrounding the shell, an air outlet to facilitate the filling with oil, and a downwardly extended skirt on the pump shaft to prevent exchange of fluids along said shaft.

2. In combination, a submergible electric motor adapted to be directly connected to a pump, a shell housing said motor and filled with liquid, a partition in said shell forming a motor compartment and a superposed liquid reservoir in communication with one another, and a fluid conduit extending from said compartment to the exterior of said shell, said conduit terminating at its lower end at the bottom of said reservoir, and at its upper end in the fluid surrounding said shell.

3. In combination, an oil filled electric motor casing, a motor in the casing, a reservoir to prevent displacement of oil in the motor casing by water, said reservoir arranged adjacent to the motor casing and adapted to house water when the oil in the motor contracts, and means to expel said water from the bottom portion of the reservoir when oil in the motor casing expands, said means also allowing water to enter the reservoir when the oil in the motor casing contracts.

4. In combination, a closed chamber containing a vertically disposed electric motor, a reservoir above and communicating with said chamber and surrounding the motor shaft, said reservoir and chamber being substantially filled with a motor protecting fluid, and a passageway placing the lower portion of the reservoir in communication with the exterior of the reservoir and chamber, and arranged to normally prevent the protecting fluid from discharging from said reservoir.

5. In combination, a shell divided by partitions into a number of superposed communicating compartments filled with liquid, an electric motor arranged in the lowermost of said compartments, and a conduit extending from the lower portion of another of said compartments to a point in the surrounding fluid and above any of said compartments.

6. In combination, a shell, partition in the shell dividing the interior of the same into a number of communicating compartments, an electric motor arranged in one of said compartments, shafting extending from said compartment through the shell to the exterior of the latter, said compartments being substantially filled with a protecting fluid for the motor, and a conduit extending from the lower portion of one of said compartments to a point above any of said compartments.

7. In combination, a shell, partitions in the shell dividing the interior of the same into a number of communicating compartments, an electric motor arranged in one of said compartments, shafting extending from said compartment through the shell to the exterior of the latter, said compartments being substantially filled with a protecting fluid for the motor, and a conduit extending from the lower portion of one of said compartments to a point above any of said compartments, said conduit being constantly open and having a trap interposed in its length.

8. In combination, a shell divided by partition means into a number of communicating compartments, an electric motor arranged in one of said compartments and having shafting extending from the motor through a wall of the shell to the exterior of the latter, and a conduit extending from the lower portion of one of said compartments to a point above any of said compartments.

In testimony whereof I affix my signature.

ARMAIS ARUTUNOFF.